Dec. 26, 1950 C. O. FAIRCHILD 2,535,628
THERMOMETER TUBE
Filed June 8, 1946
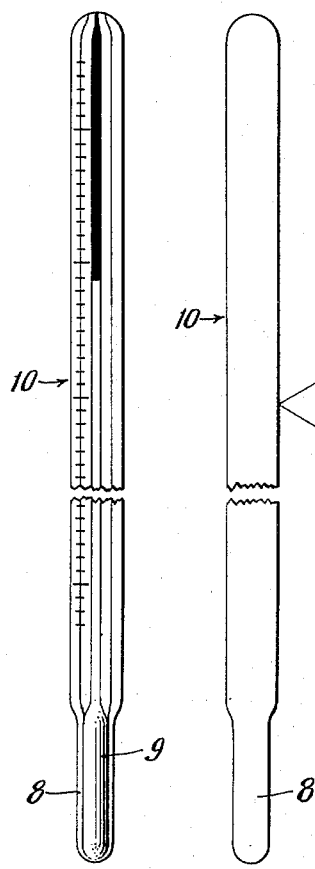
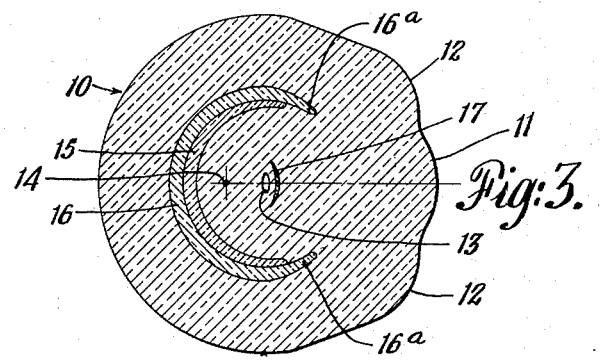
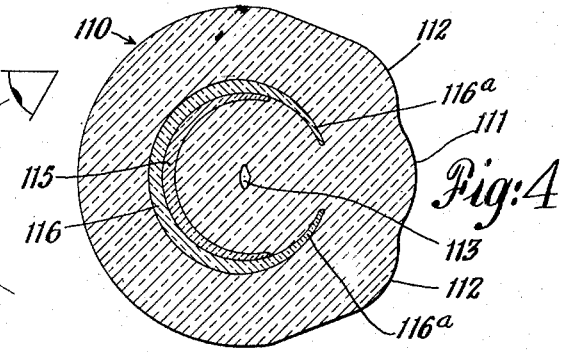
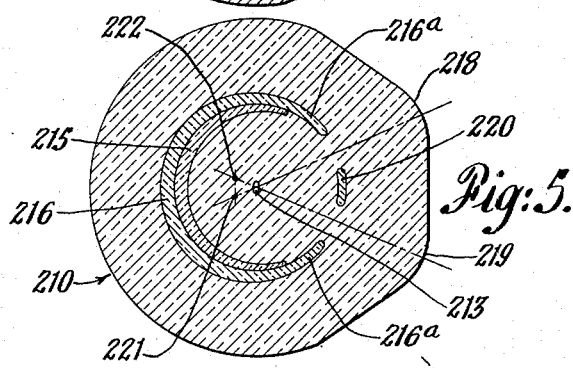
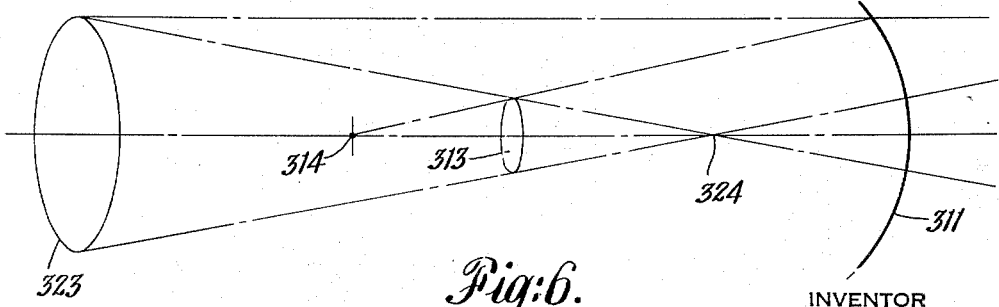
INVENTOR
CHARLES OWEN FAIRCHILD
BY
E. C. Sanborn
ATTORNEY Patented Dec. 26, 1950

2,535,628

UNITED STATES PATENT OFFICE 2,535,628

THERMOMETER TUBE

Charles Owen Fairchild, St. Albans, N. Y.

Application June 8, 1946, Serial No. 675,399

21 Claims. (Cl. 73—371)

This invention relates to improvements in thermometers, and is especially applicable to the mercury-in-glass type of thermometer. More particularly the invention relates to improvements in the construction of thermometer tubes.

Thermometers, especially those of the mercury-in-glass type, are frequently difficult to read. In previous attempts to make such thermometers more easy to read, an arcuate stripe of opaque white glass, for example, has been inlaid during the manufacture of the tube as a background against which the mercury thread in the bore should appear as a dark line. Under certain favorable lighting conditions, when the mirror surface of the mercury is not reflecting much light compared with that which diffuses from the front of the white stripe, the mercury does appear comparatively dark and the end of the mercury column can be readily located by the observer. Difficulty arises, however, under other lighting conditions when the mercury surface reflects so much light that it also appears bright and cannot be easily distinguished from the white surface behind it. Furthermore, in case the thermometer tube has been provided with the well-known cylindrical lens front, the observer's eye must remain near the axial plane of this lens, and a slight movement of the tube or observer may cause a haphazard change in the appearance of the mercury thread from dark to shiny. This sheen may appear in one eye while the thread appears dark in the other eye, a condition which is at once an annoyance and a hindrance in reading the temperature.

Tubes are frequently so constructed that the bore is not circular in cross section, but is elliptical, with the major axis of the ellipse perpendicular to the line of sight so that the bore will appear larger. The bore is placed at the principal focal line of the cylindrical lens, in order that large magnification may be obtained. When this is done, the field of view through the lens is much smaller than the virtual image of the thread, so that only the central portion of the front side of the ellipse is visible from the position near the axial plane of the lens. This part of the front surface is nearly perpendicular to the axis of sight and hence reflects back out through the lens to the observer's eye only the light which has entered within a very narrow angle, and if the face of the observer is dark and is directly in front of the thermometer, the mercury will appear dark, as desired. Difficulty is encountered, however, if the observer's eye is an appreciable distance from the axial plane of the lens so that the sides of the elliptical bore become visible. Under such circumstances, light entering from other angles may be reflected toward the observer by the sides of the bore, whether the bore is filled with mercury or empty. This reflected light will, at the high magnifications used, nearly fill the field of view, and will make it very difficult or impossible to discern the location of the end of the mercury thread. Such reflection is usually referred to in optics as "total internal reflection."

Various attempts in the past have been made to remedy this difficulty of total internal reflection from the bore. For example, the field of view has, by various means, been drastically restricted, but such arrangements frequently make it annoyingly difficult to find the direction from which the magnified image of the mercury can be seen at all. Other attempts involve the use of a bore having very sharp edges designed to reduce the possible region from which undesirable reflections may occur. Such a construction causes difficulty, however, in that it is hard to manufacture and also in that droplets of mercury are caused to adhere in the sharp troughs at the sides of the bore. Other unsatisfactory attempts to solve the problem of total internal reflection involve the use of various types of shields in combination with a supposedly light background and dark mercury thread, but such shields invariably reduce the illumination on the background, and hence decrease the contrast between the mercury and the background, and they also produce various other undesirable effects, as a result of improper formation, positioning and nature of the shields.

An object of the present invention is to provide a thermometer tube which is easily readable and which is free from the difficulties enumerated above, as well as other difficulties.

The present invention is applicable to thermometers designed to be read with the eyes of the observer lying in or near the axial plane of a viewing lens, such as clinical thermometers, and is also applicable to thermometers designed to be read with the eyes of the observer in a line approximately perpendicular to the axial plane of the viewing lens, such as wall-type thermometers.

With reference to thermometers designed to be read in the latter manner, an object of this invention is to provide binocular visibility of the whole width of the mercury thread while avoiding undesirable reflections from the edges of the thread.

A feature of the present invention is that the mercury thread appears more consistently bright against a dark background, instead of fortuitously dark against a bright background as in various earlier thermometers, thereby taking advantage of the natural reflective qualities of mercury.

A further feature of the present invention is that although the background appears dark, the level of illumination within the tube, and especially on the front of the mercury thread itself, is high.

A further feature of the present invention is that the mercury thread may have a tinted appearance with a background tinted with a contrasting color.

A still further feature of the invention is that the tube may be almost circular in cross section with the bore located near the center thereof. This approximately circular shape is advantageous from the standpoint of ease of manufacture and is also more convenient to the user. For example, chemists frequently find that thermometers the cross sections of which are approximately triangular, or otherwise considerably different from circular, cannot be easily used in some types of apparatus, such as where it is desired to insert the thermometer through a circular hole in a rubber stopper.

The above-mentioned, as well as other objects, together with the many advantages obtainable by the practice of the present invention, will be readily comprehended by persons skilled in the art by reference to the following detailed description taken in connection with the annexed drawings which respectively describe and illustrate preferred embodiments of the invention, and wherein Fig. 1 is a front elevational view of a mercury-in-glass thermometer, showing a dark background band above the mercury.

Fig. 2 is a schematic side elevational view of a thermometer as it might be viewed by an observer, the line of sight in this case being directed downwardly from the horizontal.

Figs. 3 and 4 are enlarged cross-sectional views of thermometer tubes illustrating embodiments of the present invention.

Fig. 5 is an enlarged cross-sectional view of a clinical thermometer, also illustrating the teachings of the present invention, the scale of enlargement being greater in this case than in Figs. 3 and 4, since clinical thermometers are in fact normally considerably smaller than other types of thermometers.

Fig. 6 is a schematic diagram illustrating certain optics involved in the present invention.

In Fig. 1 there is generally illustrated a thermometer to which the teachings of this invention are applicable. Such a thermometer may be provided with a glass bulb 8, filled with mercury 9. Integrally formed with and communicating with the bulb is a glass tube, generally indicated at 10. Various embodiments will be described below of tubes which may be used in such a thermometer.

The schematic side elevational view shown in Fig. 2 illustrates the manner in which a thermometer of the wall type may sometimes be viewed by an observer. At a later point, certain disadvantages of previous thermometers will be pointed out in connection with this manner of viewing, along with advantages of thermometers constructed according to the present invention.

Reference is made to Fig. 3 which shows, in enlarged cross section, one embodiment of a thermometer tube illustrating the teachings of the present invention. The tube 10 is provided with portions forming a cylindrical viewing lens 11, and a pair of cylindrical, auxiliary, light-gathering lenses 12, 12. It is to be understood that the term "cylindrical" is used in this application with its broad meaning, applying to any curved surface generated by the motion of a straight line parallel to itself and constantly intersecting a curve. It may be noted that this curve need not necessarily be circular. While the lenses in the various illustrated embodiments may satisfactorily have cross sectional contours which are circular arcs, the present invention is not limited to such configurations.

The tube 10 is provided with a lengthwise bore 13, located in the axial plane of the viewing lens 11 and closer to this lens than the principal focal line of this lens. The position of this focal line is indicated by the numeral 14. The bore 13 may be shaped in cross section in the form of an ellipse with its major axis perpendicular to the axial plane of the viewing lens 11. The lenses 12, 12 are focused on the bore 13.

The tube is provided with a stripe or band 15 of colored, dark, or selectively absorbing glass. This stripe is generally parallel to the bore 13, and in cross section embraces same from the rear, that is, from the direction opposite the viewing lens, through a subtended angle of more than 180° and less than 210°, or preferably approximately 200°. Thus the stripe 15 may extend in a somewhat circumferential manner partly around the bore, so as to subtend at the bore approximately 20° more than the rear half of the tube, that is, 10° beyond exactly half, at each end. Outside the stripe 15, which in the present example may be black, is a stripe 16 of light or white, diffusing glass, which prevents light which has entered the tube at various points from being largely absorbed by the dark stripe. Thus this light-colored stripe raises the level of illumination within the tube. The dark stripe serves both as a background in the line of sight past the bore and as a shield of the same shade as this background to be reflected by the empty bore in the major portions of the zones of total reflection. Thus, if there were no such shield, light striking the bore from a direction corresponding to one end of the crescent-like cross-section of the dark stripe would be reflected out the lens 11, causing the empty bore to appear bright. Inasmuch as the dark stripe is present, however, any reflections of light coming from this direction appear dark, and merge with the dark background. Inasmuch as the dark stripe does not extend very far forward of the bore, it permits the bore to be illuminated from the front so that the mercury-filled bore appears bright, as desired, against the dark background. The ends or edge regions 16a, 16a of the white stripe are extended in thinner section forward of the dark stripe so as to transmit and scatter light received from various directions toward the bore on its forward side. There is provided in front of and close to the bore 13 a thin, diffusing and partially transparent stripe or screen 17, which transmits and scatters toward the mercury surface light received from all forward directions, and acts likewise on light reflected from that surface, so that the mercury-filled bore appears bright from all directions against the dark background. The light-gathering lenses 12, 12, being focused on the bore, concentrate light upon it and help to cause the mercury thread to appear bright.

Without the stripe 17 or the portions 16a of stripe 16 or both, if the observer is looking at the thermometer in a manner such as that illustrated in Fig. 2, a dark object might be clearly reflected in the mercury, causing the mercury to appear dark and hence indistinguishable from the dark background. Certain previous attempts to construct thermometer tubes with dark backgrounds have had disadvantages of this nature. By the means described, however, this difficulty has been overcome in the present invention.

It is to be understood that of the light from the front striking the screen 17 only a small fraction is scattered toward the front and that where this screen is backed by the empty bore most of the light scattered toward the back is absorbed by the dark stripe 15. Where the screen 17 is backed by the mirror surface of the mercury the bore appears to glow, and in fact it is not required that screen 17 completely destroy the mirror-like or specular reflection from this surface.

Opal, milk or white glasses used as screen 17 for scattering or diffusing light do not in general scatter light of all colors equally. Hence the mercury thread behind this screen may appear tinted or colored. This is not objectionable, and may be enhanced by deliberate addition of coloring matter of the same hue to the glass from which the screen 17 is formed, or a neutralizing color may be added to whiten the light issuing from the front of the screen 17. If this light is tinted or colored, for example, red or orange, the stripe 15 can be colored green or blue, instead of black, to selectively absorb light which has passed toward the stripe through screen 17 and the empty bore. If the screen 17 is not tinted, the main body of the tube 10 may be tinted or colored instead. While the combination described is particularly adaptable to the employment of color contrast between the mercury-filled and empty bore, it should be kept in mind that where the tube is illuminated by white light or ordinary daylight, color contrast is obtained only with considerable sacrifice of brightness contrast.

The simple optics involved with the bore and the viewing lens 11 is illustrated in Fig. 6. In this figure there is shown in schematic cross section a cylindrical lens surface 311, similar to the lens 11, and an elliptical bore 313 similar to the bore 13. The focal line 314 of the lens 311 is located to the left of the bore 313. The diagram shows the position of the virtual image 323 of the bore 313, and it is noted that in this illustration the magnification is rather limited, being approximately three times.

In the drawings the lenses are shown as having circular cross-sectional contours, although, as stated, other configurations could be used satisfactorily. The center of curvature of the lens 311 is shown at 324.

It is observed that with the focal line 314 of the lens 311 located to the left of the bore 313 the rays from said bore emerging toward the right from the lens diverge in a wedge. If the angle between the sides of this wedge is greater than approximately 14°, binocular visibility of the bore is possible with the eyes of the observer in a line perpendicular to the axial plane of the lens and symmetrically spaced on either side of this plane. This angle is based upon the average spacing between the eyes of humans, about 2.5 inches, and the average near point distance of normal vision, of about 10 inches.

Reference may be made to Fig. 4, which illustrates a somewhat different embodiment. In this figure the tube is indicated generally by the numeral 110, and is provided with a viewing lens 111 and a pair of light-gathering lenses 112, 112, similar to the lenses 11 and 12, 12 of Fig. 3. There is provided a bore 113, the cross-section of which may have the shape of a distorted ellipse, to be described in more detail below. The relative positions of the focal lines of the lenses with respect to the bore are similar in Fig. 4 to those in Fig. 3.

There is provided a light-absorbing stripe 115, corresponding to the stripe 15 of Fig. 3. Outside this stripe is a light stripe 116, having ends 116a, 116a, which extend to include the subtended angles of the lenses 112, 112, respectively, and which are drastically thinned, in contrast to the shape of the ends 16a, 16a shown in Fig. 3. There is no stripe in the embodiment of Fig. 4 corresponding to the stripe or screen 17 of Fig. 3.

The ends 116a, 116a serve to diffuse and scatter light toward the viewing side of the bore, especially light entering through the lenses 112, 112.

The bore 113 has flat sides respectively facing approximately half-way between the viewing lens 111 and the light-gathering lenses 112, 112. Stated differently, the flat sides are respectively approximately perpendicular to the planes which bisect the angles between the axial plane of the viewing lens and the respective axial planes of the light-gathering lenses. The flat sides are joined at the front by a curved surface, which may be of shape similar to the ends of the ellipse. Where the front surface of the bore is perpendicular to the line of sight, there will upon occasion appear a dark stripe as a result of reflection of a dark object, but this will not influence the visibility of the mercury thread and its contrast with the background because this stripe includes only a small fraction of the visible width of the bore. In this connection it is to be remembered that the bore is not at the principal focus where the magnification would be in the neighborhood of 100 times, but forward of the focus where the magnification will be sufficient to make the virtual image comparable in size with the window of the lens or even smaller if the bore 113 is particularly small. Obviously, the dark stripe on the mercury, mentioned above, will not be as dark as it would be were the front of the mercury thread not well illuminated, and will in any case be lighter than the background. The statements about colors and coloring in connection with stripes 15, 16 and 17 in Fig. 3 apply in Fig. 4, in connection with stripes 115, 116 and the drastically thinned ends 116a, 116a of stripe 116.

Fig. 5 shows the cross section of a tube of a clinical thermometer on a still larger scale, these thermometers usually being smaller than others. This embodiment is provided with an elliptical bore 213 and with two lenses 218 and 219 either of which can be used as a viewing lens while the other permits light to reach the mercury thread. It is customary to read a clinical thermometer with both eyes on or near the axial plane of the viewing lens and of course it is improper to attempt to read such a thermometer from such a position as that illustrated in Fig. 2. If the lens nearest to the observer is used, light from the ceiling of the room, or from a window, may enter the other lens. If the observer is a nurse in a white dress she may look through the farther lens while light from her dress enters the near lens, making the mercury thread appear a flat white against the dark background. Stripes 215, and 216 with the ends 216a, 216a are disposed similarly to those shown in Fig. 3. There is provided a light stripe 220 of the same glass as that of the stripe 216 and subtending the angle between the lenses 218 and 219, and serving as an additional diffusing means which has its particular duty when the main source of light is at one side of the observer. Lenses 218 and 219 are not focused on the bore but are focused beyond the bore on lines 221 and 222, like lens 11 in Fig. 3, so that in Fig. 5, the bore will be magnified for example 4 or 5 times instead of the three times shown in Fig. 3 which generally suffices for ordinary large bores. The bore in Fig. 5, although smaller than in the type of thermometer shown in Figs. 3 and 4, does not have to be highly magnified because it is well illuminated and being in front of the principal focus of the viewing lens, its image can be found by an observer whose eyes are well away from the axial plane of the lens, in the diverging wedge of reflected light issuing from the lens. This diverging wedge need not have an angle of 14° or more as would be required for binocular observation with the observer's eyes on opposite sides of the axial plane of the lens, because, as stated, the clinical thermometer is always read with both eyes in this plane, or near it on the same side—but an angle of 10°, for example, is very helpful as an aid to finding the line of sight. Having this aid a novice needs none of the painstaking instruction required for reading clinical thermometers having the conventional white back and with a bore at the principal focus where it is visible through an angle of 1° or less.

In the various embodiments it is preferable that each lens subtend an angle of less than 50° at the bore, since this will result in a more nearly round tube. It is also preferable that the aggregate subtended angle of the lenses be greater than 80°, since this results in gathering and directing toward the mercury a greater amount of light, especially when the observer is on the viewing axis of one lens.

It is obvious that reflections from the outer surface of the thermometer tube could be practically eliminated by the now well known means for non-glare treatment, thus further improving the general readability of the thermometer.

It may be pointed out that a narrow bright line, such as that corresponding to the mercury thread in the present thermometer, is inherently easier to see than a narrow dark line, and is comparable in visibility with the broader, supposedly dark line corresponding to the mercury thread in certain previous thermometers.

It can be seen that for the various above reasons, the present invention provides a thermometer tube which, in addition to other advantages, gives improved contrast between the appearance of the empty bore and that of the filled part, regardless of the lighting conditions and relative positions of the thermometer and observer.

While the illustrative forms of the invention have been disclosed in considerable detail, it will be understood that various changes may be made in the construction and arrangement of the several parts without departing from the general principles and scope of the invention as defined by the appended claims.

I claim:

1. A glass thermometer tube having a longitudinal bore, a viewing lens on the front of said tube focused in the rear of said bore, at least one auxiliary lens adjacent said viewing lens focused on said bore, a longitudinal dark stripe embedded in said tube embracing more than the rear half of said bore, a longitudinal light stripe embedded in said tube outside said dark stripe embracing said bore on all sides except in the angle subtended by said lenses at said bore, and a thin diffusing stripe parallel to said bore subtending at said bore at least the angle of said viewing lens.

2. A thermometer tube having a longitudinal bore and a plurality of cylindrical lenses, at least one of said lenses having its principal focal line located beyond said bore from said one lens, and at least one of said lenses having its principal focal line substantially at said bore.

3. A thermometer tube of slightly distorted circular cross section having a longitudinal bore and a plurality of cylindrical lenses, at least one of said lenses having its principal focal line located beyond said bore from said one lens, said bore being in cross section of the general shape of an ellipse with its major axis perpendicular to the axial plane of said one lens, at least one of said lenses having its principal focal line substantially at said bore.

4. A thermometer tube having a longitudinal bore, a plurality of cylindrical lenses on the front side of said tube, at least one of said lenses being focused beyond said bore, and a relatively dense shield stripe parallel to and behind said bore, subtending in cross section more than 180° and less than 210°.

5. A thermometer tube having a longitudinal bore, a plurality of cylindrical lenses on the front side of said tube, at least one of said lenses being a viewing lens and having its principal focal line displaced from said bore in a direction opposite said one lens, and a relatively dense shield stripe parallel to and behind said bore comprising a background therefor and subtending in cross section sufficiently more than the rear half thereof to reduce substantially total internal reflection of light by said bore through said viewing lens.

6. A thermometer tube having a longitudinal bore, said tube being shaped to form a plurality of parallel adjacent longitudinal lenses on the front of said tube, at least one of said lenses being focused beyond said bore, a longitudinal dark stripe of arcuate cross section behind and generally parallel to said bore, subtending an angle of substantially 200° at said bore, and a light stripe of arcuate cross section behind and generally parallel to said dark stripe, said light stripe extending partly around said bore outside said dark stripe and beyond each longitudinal edge of said dark stripe so as to subtend a greater angle at said bore than does said dark stripe.

7. A thermometer tube shaped to form a plurality of parallel adjacent longitudinal lenses on the front of said tube, said tube having a longitudinal bore, at least one of said lenses having its principal focal line located beyond said bore from said one lens, and at least one of said lenses having its principal focal line substantially at said bore, a longitudinal dark stripe of arcuate cross section behind and generally parallel to said bore, subtending an angle of more than 180° and less than 210° at said bore, and a light stripe of arcuate cross section behind and generally parallel to said dark stripe, said light stripe extending partly around said bore outside said dark stripe and beyond each longitudinal edge of said dark stripe so as to subtend a greater angle at said bore than does said dark stripe.

8. A thermometer tube having a longitudinal bore, a viewing lens on the front of said tube focused in the rear of said bore, an auxiliary lens on each side of said viewing lens focused on said bore, a longitudinal dark stripe embedded in said tube partly embracing said bore from the rear, and a longitudinal light stripe embedded in said tube outside of said dark stripe embracing said bore on all sides except in the angle subtended by said viewing lens at said bore.

9. A thermometer tube having a longitudinal bore, a viewing lens on the front of said tube focused in the rear of said bore, an auxiliary lens on each side of said viewing lens focused on said bore, a longitudinal dark stripe embedded in said tube partly embracing said bore from the rear, and a longitudinal light stripe embedded in said tube outside said dark stripe embracing said bore on all sides except in the angle subtended by said viewing lens at said bore, said light stripe being so thin in the regions adjacent said auxiliary lenses that it transmits toward the bore a major fraction of the light converging toward said thin regions from the auxiliary lenses.

10. A glass thermometer tube having a capillary bore and at least one lens front having its principal focus at such a distance in the rear of said bore that the light reflected from said bore emerging from said lens fills a wedge the sides of which diverge at an angle of more than 14°.

11. A thermometer tube having a longitudinal bore of approximately elliptical cross section, a dark stripe embracing substantially the rear half of said bore, two lenses extending longitudinally along the front half of said tube each having its axial plane passing approximately through said bore, and each said lens having its principal focal line located farther than said bore from said lens, a light stripe outside said dark stripe partly embracing said bore through the subtended angle extending rearwardly around the bore between the rearmost longitudinal edges of the two lenses respectively, and a light stripe in front of said bore extending through the subtended angle between the two lenses, as measured between their respective adjacent longitudinal edges.

12. A glass thermometer tube having a capillary bore for receiving mercury, a dark stripe parallel to said bore and shielding same on all of its rear side, light-scattering stripe means embedded within said tube adapted to maintain said bore brighter on its forward side than said stripe when said bore is filled with mercury, at any degree of illumination of said tube, for any direction of incident or issuing light, and a viewing lens focused behind said bore.

13. A glass thermometer tube having a capillary bore for receiving mercury, a dark stripe parallel to said bore and shielding same on all of its rear sides, light-scattering stripe means embedded within said tube adapted to maintain said bore brighter on its forward side than said stripe when said bore is filled with mercury, at any degree of illumination of said tube, for any direction of incident or issuing light, and a plurality of lens fronts, the axial planes of which pass through said bore, at least one of said lens fronts being focused behind said bore.

14. A glass thermometer tube having its outer surface shaped to form a plurality of parallel lenses extending longitudinally along the front half of said tube, at least one of said lenses having its principal focal line on the opposite side of said bore from said one lens, the glass of the main body of said tube being lightly colored to render light transmitted thereby dominant in a predetermined color, and a light-absorbing stripe embedded in said tube embracing approximately the rear half of said bore, said stripe being adapted to absorb selectively light of said color.

15. A thermometer tube having a longitudinal bore, a viewing lens on the front of said tube having its principal focal line behind said bore, an auxiliary lens on each side of said viewing lens, each of said auxiliary lenses having its principal focal line substantially at said bore, said bore being shaped in cross section in the general form of a distorted ellipse, said ellipse having its major axis perpendicular to the axial plane of the viewing lens and being distorted by having flattened sides respectively perpendicular to the planes which bisect the angles between the axial plane of the viewing lens and the axial planes of the respective auxiliary lenses, a dark stripe embracing said bore from a direction opposite said viewing lens, and light-diffusing means embedded within said tube between said auxiliary lenses and said bore.

16. A thermometer comprising a tube having a bore extending longitudinally therethrough, a bulb communicating with said bore, and mercury in said bulb and a portion of said bore, said tube having a lens front the principal focal line of which is located in the rear of said bore at such a relative distance that the whole width of the virtual image of said bore is visible to an observer whose eyes are in a line at right angles to the axial plane of said lens front and symmetrically spaced from said plane, said line being at a distance of 10 inches from said lens front, said tube also having longitudinal stripe means embedded therein for substantially reducing the visibility of the total internal reflections seen in the side zones of said image.

17. A glass thermometer tube of slightly distorted circular cross section having a generally central longitudinal bore, the outer surface of said tube being shaped to form a plurality of parallel cylindrical lenses extending longitudinally along the front side of said tube, each of said lenses having its axial plane passing through said bore, the distance from at least one of said lenses to its principal focal line being sufficiently greater than that to said bore that the whole width of the virtual image of said bore is visible through said one lens when viewed in a normal manner from points lying in the axial plane of said one lens, and embedded stripe means adapted to reduce substantially the visible internal reflection from said bore.

18. A thermometer tube having a longitudinal bore for receiving mercury, at least one viewing lens focused beyond said bore, embedded light-absorbing means forming a background against which said bore may be viewed, at least one light-gathering lens, embedded light scattering and diffusing means, and embedded means for substantially reducing the total internal reflection of light by the bore through said viewing lens.

19. A thermometer tube having a longitudinal bore for receiving a column of mercury, at least one viewing lens focused behind said bore, embedded light-absorbing means forming a background against which said bore may be viewed, at least one light-gathering lens focused on said bore, embedded light scattering and diffusing means, and embedded means for substantially reducing the total internal reflection of light by the bore through said viewing lens, each of said lenses subtending an angle of less than 50° at said bore, the aggregate angle subtended at said bore by all said lenses being greater than 80°.

20. A thermometer tube according to claim 10, including a longitudinal stripe embracing said bore from the rear, subtending at said bore in cross-section an angle of more than 180° and less than 210°.

21. A thermometer tube having a longitudinal bore, a lens front focused behind said bore, and a longitudinal stripe embracing said bore from the rear through an angle greater than 180°.

CHARLES OWEN FAIRCHILD.

REFERENCES CITED

The following references are of record in the file of this patent:

UNITED STATES PATENTS

| Number | Name | Date |
|---|---|---|
| 278,380 | Weinhagen | May 29, 1883 |
| 310,925 | Weinhagen | Jan. 20, 1885 |
| 1,561,925 | Hespe | Nov. 17, 1925 |
| 1,630,385 | Hespe | May 31, 1927 |

FOREIGN PATENTS

| Number | Country | Date |
|---|---|---|
| 149,361 | Germany | Mar. 14, 1904 |
| 357,254 | Germany | Aug. 19, 1922 |